Figure 1:
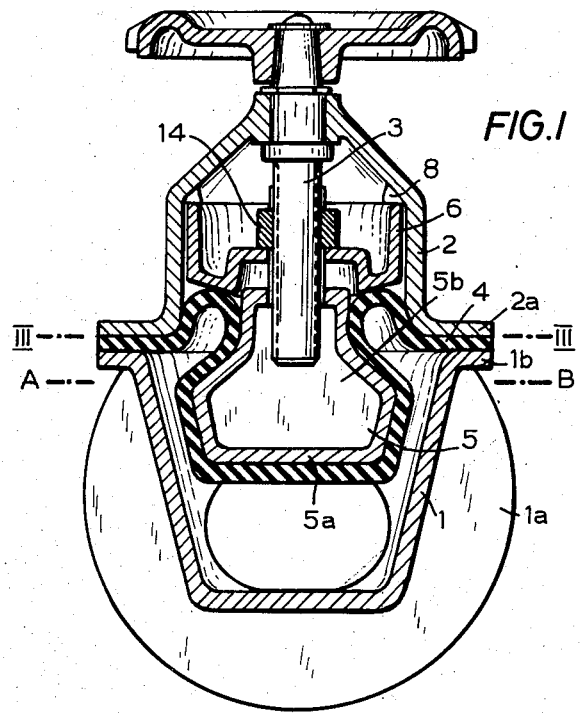

Sept. 20, 1960  H. LIECKE ET AL  2,953,346
GATE VALVES

Filed Feb. 28, 1957  4 Sheets-Sheet 1

INVENTOR.
*H. Liecke & G. Hesse*
BY
*Lowry & Rinehart*
ATTYS.

Sept. 20, 1960 H. LIECKE ET AL 2,953,346
GATE VALVES
Filed Feb. 28, 1957 4 Sheets-Sheet 3

INVENTORS
H. Liecke & G. Hesse
BY
Lowry & Rinehart

ATTYS.

Sept. 20, 1960 H. LIECKE ET AL 2,953,346
GATE VALVES
Filed Feb. 28, 1957 4 Sheets-Sheet 4
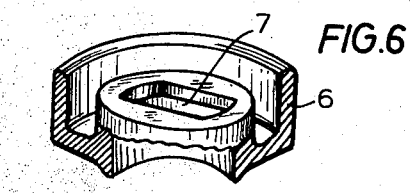
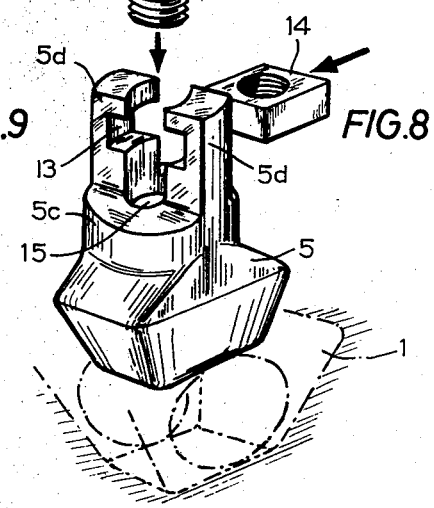
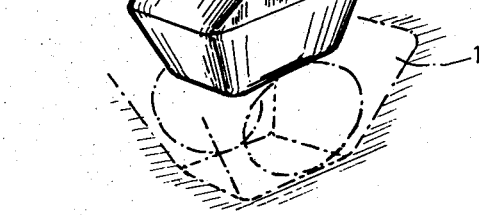
INVENTORS
H. Liecke & G. Hesse
BY
Lowry & Rinehart
ATTYS.

United States Patent Office 2,953,346
Patented Sept. 20, 1960

2,953,346

GATE VALVES

Hans Liecke and Gerhard Hesse, Burscheid, Rhineland, Germany, assignors to Hochdruck-Dichtungs-Fabrik Schmitz & Schulte, Burscheid, near Koln, Germany Filed Feb. 28, 1957, Ser. No. 643,114

Claims priority, application Germany Feb. 29, 1956

1 Claim. (Cl. 251—327)

This invention relates to a gate valve of the kind comprising a gate which, in plan view, is shorter in the direction of flow through the valve than in the direction transverse to the direction of flow through the valve, a spindle mechanism for moving the gate and thus opening and closing the valve, and a resilient diaphragm or covering member enclosing the gate and secured between the body and the bonnet of the valve.

Gate valves of the kind set forth are generally known, and have proved valuable in practice. In one construction the gate has a portion shaped like a truncated pyramid, the smaller plane surface of which is adapted to engage against the body and to close the valve. In cross section, the gate may have the shape of an elongated rectangle or ellipse, of which the shorter axis extends in the direction of flow through the valve and the longer axis extends transverse to the said direction of flow.

With valves of large nominal bore, the otherwise advantageous construction of a gate which is narrower in the direction of flow as compared with the other direction, has the disadvantage that the place where the covering is clamped between the body and the bonnet, owing to the different dimensions in the direction of flow and transverse thereto, is situated at different distances from the gate. The result is that the covering is subjected to non-uniform stressing, and, since the opening and closing of the valve subjects the covering to a movement whereby non-uniform folds are produced, stresses are produced in the covering which are augmented considerably by the force exerted by the pressure medium flowing through the valve. This non-uniformity of stressing could be reduced by constructing the gate of circular cross-section, but the circular cross-section i.e. the semispherical shape of the gate has, precisely in the case of large nominal bores, the disadvantage that the valve is extremely broad in the direction of flow and is thus unwieldy. Also the hemi-spherical shape of the gate entails other disadvantages.

According to the invention there is provided a valve of the kind set forth, wherein the gate has a first portion which, in plan view, is shorter in the direction of flow through the valve than in the direction transverse to the direction of flow through the valve, and a second portion which is substantially circular in plan view, the two portions merging gradually one into the other, the second portion being connected to the valve spindle, and wherein the portions of the body and the bonnet, between which the covering is secured, are circular, whereby the force exerted on the covering is substantially uniform when the valve is in operation. The two portions advantageously merge at the place where the covering begins to leave the gate, i.e. where the covering commences folding. The diameter of the second portion of the gate is preferably equal to or less than the width of the first portion of the gate.

In this way it is possible to use gate valves, the gate of which is covered by a diaphragm for the control of pressure media, even for valves of large or very large nominal bores, without there being any risk of unallowable stressing or folding of the diaphragm. The valve itself remains relatively narrow in the direction of flow, so that the advantages of a narrow gate which is elongated transverse to the direction of flow are effectively combined with those of a valve in which the distances between the place where the diaphragm is clamped and the core of the gate are equal, whereby non-uniform distribution of the force of the pressure medium is eliminated. Above all it is possible for the body of the valve, despite the great length of the gate transverse to the direction of flow, to be kept compact by the narrowing of the gate in this direction. In this way the diaphragm or covering surface as a whole is reduced, as is the force of the pressure medium acting on the diaphragm surface. The force required to operate the valve can be much less, and this has the result that a smaller piston can be used in cases where power drives are used for operating the valve.

Figure 3:
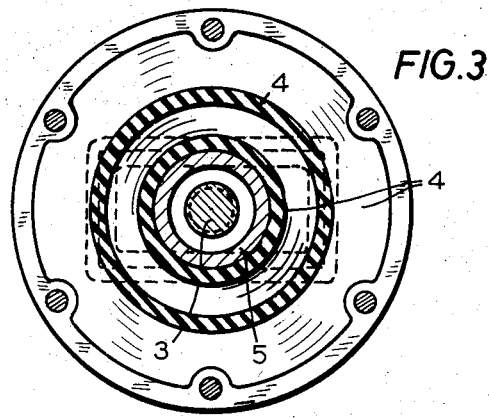
Figure 2:
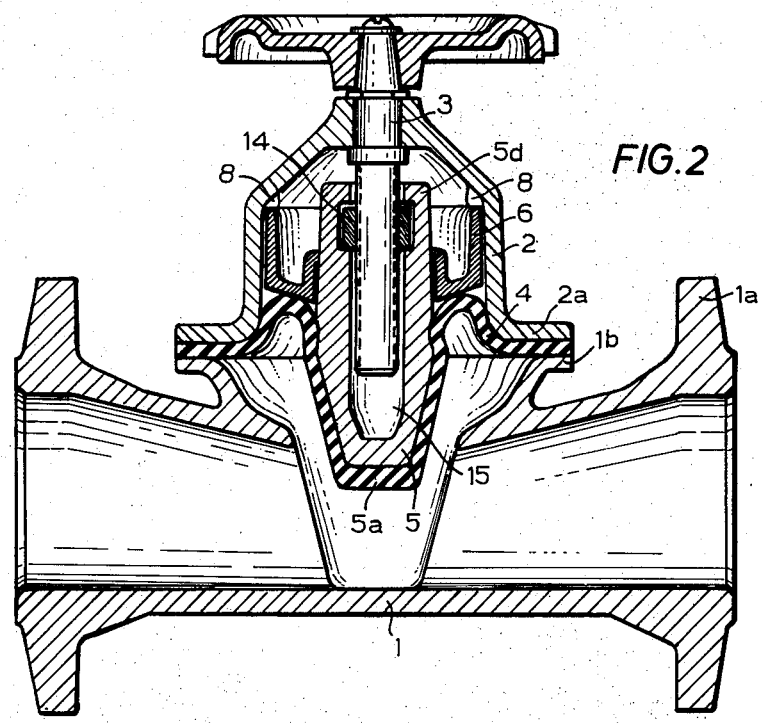
Figure 11:
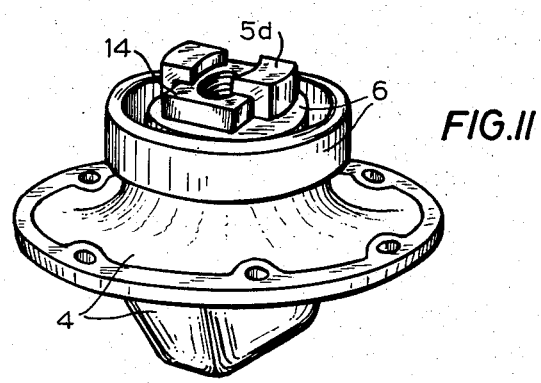
Figure 4:
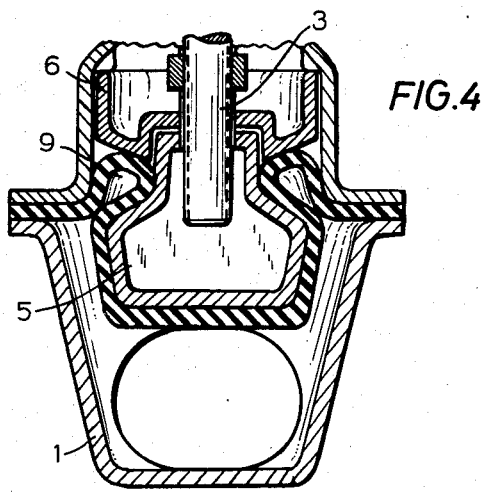
Figure 5:
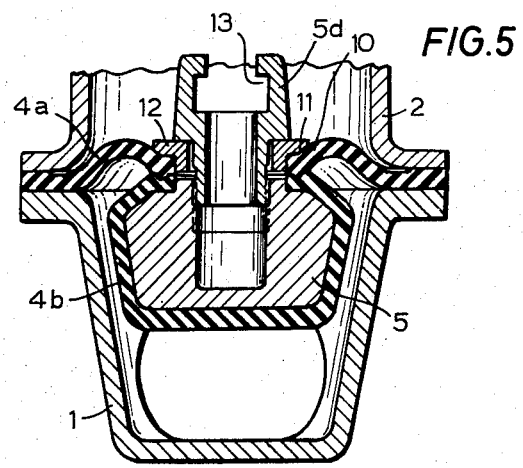

For a better understanding of the invention, and to show how the same may be carried into effect, reference will now be made to the accompanying drawings, in which:

Figure 1 is a vertical section of a gate valve taken transverse to the direction of flow through the valve, Figure 2 is a vertical section in the direction of flow through the valve shown in Figure 1, Figure 3 is a cross-section of the valve taken on the line III—III of Figure 1, Figure 4 is a vertical section of the valve corresponding to Figure 1, but showing the valve completely opened, Figure 5 is a vertical section, similar to Figure 1, of a modification of the valve, Figures 6 to 9 are perspective views, partly in section, of components for connecting the valve spindle to the gate of the valve, Figure 10 is a perspective view showing the diaphragm or covering for the gate by itself, and Figure 11 is a perspective view showing the gate covered by the diaphragm.

Referring now to Figures 1 to 4, there is shown a gate valve having a diaphragm or covering for the gate. The valve consists of a body 1 formed with a fixing flange 1a, and a bonnet 2 in which a spindle 3 is so guided as to act as a non-rising spindle. A diaphragm or covering 4 is clamped between the body 1 and the bonnet 2, the covering 4 surrounding a gate 5. The gate 5 has a flat bottom 5a from which the gate tapers upwardly and outwardly in the form of an inverted, truncated pyramid. The gate 5 is rectangular in plan view, with the shorter or lateral axis extending in the direction of flow through the valve, and with the longer or longitudinal axis extending transverse to such direction. The general form of the gate is known, and has many advantages. The gate narrows upwardly towards the spindle from the maximum cross-section of the portion having the form of a truncated pyramid, i.e. from the level of the line A—B in Figure 1, the narrowing being such that the smallest cross-section of the narrowed portion 5b of the gate is circular or approximately circular. The diameter of the resulting circular portion is expediently defined by the width of the gate 5 in the direction of flow through the valve (Figures 2 and 9). Thus, in a plane transverse to the direction of flow through the valve, the gate 5 is narrowed inwardly and upwardly so as to have a width equal to the width of the gate in such direction. Despite the shaping of the gate 5, flanges 1b and 2a of the body and bonnet are circular, thus facilitating machining not only of the body and bonnet, but also of the mould for the manufacture of the covering 4, since the surfaces in question can be machined-turned.

The gate construction is applicable not only to gates having a portion in the form of a truncated pyramid, as just described, but to all gates which in cross-section are shorter in one direction than in the other. In the case of valves of relatively large nominal bores, the invention is particularly applicable, but is also advantageous for valves of relatively small nominal bores.

The diaphragm or covering 4 is supported by means of a supporting ring 6 at a place where the covering is folded, the ring 6 bearing against the covering 4 and being lifted thereby. The ring 6 is prevented from rotating by shoulders 5d which are formed on the gate and which engage in an elongated aperture 7 formed in the ring 6. When in position, the supporting ring 6 abuts against shoulders 8 formed in the bonnet 2. The position of the shoulders 8 is so chosen that the supporting ring 6 abuts against the shoulders 8 before the valve is fully opened (Figures 1 and 2). The gate 5, however, can be lifted further by means of the spindle 3 for fully opening the valve. This has the result that, with the supporting ring 6 stationary, the curved portions at the beginning of the folded portions of the covering 4 come into contact with one another (see Figure 4), as a result of which hollow spaces 9 in these curved portions are closed off, and are thus no longer subjected to the action of the pressure medium passing through the valve.

Referring now to Figure 5, there is shown a modification in which the covering is divided into an annular part 4a which is clamped between the body 1 and the bonnet 2, and a further part 4b which surrounds the gate 5. The two parts 4a and 4b have annular surfaces 10 which abut against one another, and fluid-tightness can be augmented by forming a rib 11 on the part 4a, which rib 11 engages in a corresponding annular groove in the part 4b. The rib 11 can be arcuate e.g. semi-circular in cross-section, or may be pointed in cross-section, or a plurality of pointed ribs can engage against one another. The two diaphragm parts 4a and 4b are pressed fast against one another by a locking nut 12. In other respects, the valve shown in Figure 5 is similar to that shown in Figures 1 to 4, the gate being, however, formed from the screw-connected portions 5 and 5d. The division of the covering in the manner outlined above, has the advantage that different qualities of material can be used for the parts of the covering. For example, the annular part 4a can be made of a harder quality of rubber than the part 4b surrounding the gate 5.

Referring now to Figures 6 to 11, there is shown the connection between the gate 5 and the non-rising spindle 3, this connection being primarily for the valve shown in Figures 1 to 4, but being also applicable to the valve shown in Figure 5. The gate, which has a cylindrical portion 5c at the end of the narrowed portion, is formed with claw-like projections at the ends of the shoulders 5d.

The space 13 formed by the claws accommodates a spindle nut 14, and the supporting ring 6 is situated between the spindle nut 14 and a shoulder formed above the cylindrical portion 5c as shown in Figure 11. After the spindle 3 is screwed into the nut 14, the spindle engages in a cylindrical hole 15 formed in the gate, and the spindle 3 prevents the nut 14 from falling out of position laterally. The projecting edges of the nut hold the covering 4 and the ring 6 together (Figure 11), the ring 6 being vertically displaceable below the nut 14. This arrangement permits simple assembly of all the parts.

What we claim is:

A gate valve comprising a tubular body including a passage for fluid to pass therethrough, a valve seat disposed transversely of the longitudinal axis of said passage, said valve seat having the shape of an inverted, truncated pyramid, said valve seat merging into an annular bell-shaped cavity surrounded by a circular mounting flange, a bonnet including a circular mounting flange overlying said first mentioned mounting flange, a spindle mounted on said bonnet and depending toward said valve seat, a gate valve element operatively connected to said spindle for movement toward and away from said valve seat, said gate valve element including a lower inverted, truncated pyramid-shaped portion conforming to the shape of said valve seat and merging into a portion having a circular cross-section, and a flexible diaphragm surrounding said valve element and conforming to the truncated, pyramid-shaped portion and including an annular flange portion sealingly engaged between said mounting flanges, said gate valve element changing shape from a rectangular cross-section below a contractible portion of said diaphragm to a circular cross-section at said contracted portion, said annular flange portion being subject to equally distributed fluid pressure forces within said annular bell-shaped cavity in the body, the portion of said gate valve element having the greatest width being disposed normal to the longitudinal axis of said passage, the frusto-pyramidal portion of said gate valve element and conforming diaphragm portion having a height equal to the depth of said valve seat, the diameter of the circular cross-section portion of said gate valve element at the juncture with the rectangular cross sectioned portion thereof being substantially equal to the maximum transverse width of said gate valve element in a direction measured along the longitudinal axis of said valve body.

References Cited in the file of this patent
UNITED STATES PATENTS

| | | |
|---|---|---|
| 2,420,849 | Wilson | May 20, 1947 |

FOREIGN PATENTS

| | | |
|---|---|---|
| 507,038 | Belgium | of 1951 |
| 515,632 | Belgium | Dec. 15, 1952 |
| 902,924 | Germany | Jan. 28, 1954 |
| 1,080,433 | France | June 2, 1954 |
| 729,069 | Great Britain | of 1955 |